United States Patent [19]
Heimbuch et al.

[11] Patent Number: 5,448,314
[45] Date of Patent: Sep. 5, 1995

[54] METHOD AND APPARATUS FOR SEQUENTIAL COLOR IMAGING

[75] Inventors: Scott D. Heimbuch, Dallas; Jeffrey B. Sampsell; Robert J. Gove, both of Plano; Stephen W. Marshall, Richardson; Donald B. Doherty, Irving; Gary L. Sextro, McKinney; Carl W. Davis, Plano; Joseph G. Egan, Garland, all of Tex.

[73] Assignee: Texas Instruments, Dallas, Tex.

[21] Appl. No.: 179,028

[22] Filed: Jan. 7, 1994

[51] Int. Cl.⁶ .............................................. H04N 9/12
[52] U.S. Cl. .................................... 348/743; 348/270; 348/771
[58] Field of Search ............... 348/743, 742, 771, 268, 348/270, 269; 358/42, 230; H04N 9/12, 9/04, 9/083, 3/06, 9/14, 9/31; 345/84, 85

[56] References Cited

U.S. PATENT DOCUMENTS

| | | | |
|---|---|---|---|
| 2,921,118 | 1/1960 | Benjamin | 348/743 |
| 3,685,899 | 8/1972 | Reeds | 348/743 |
| 4,399,455 | 8/1983 | Alvarez | 348/743 |
| 4,851,899 | 7/1989 | Yoshida | 348/270 |
| 5,192,946 | 3/1993 | Thompson | 348/743 |
| 5,233,385 | 8/1983 | Sampsell | 348/270 |

Primary Examiner—James J. Groody
Assistant Examiner—Sherrie Hsia
Attorney, Agent, or Firm—Julie L. Reed; Richard L. Donaldson; Rene E. Grossman

[57] ABSTRACT

A sequential color system is provided in which a processor (22) is coupled to a memory (24) and a receiver (27). Images are generated by shining light from a light source (28) through a color wheel (30) and onto DMD array (26). Light from the DMD array (26) is shone on screen (32). By adjusting the speed and make-up of color wheel (30) color separation is greatly reduced or eliminated. Also there are techniques for sequential imaging which may be applied to other technologies, such as CRT technologies.

20 Claims, 3 Drawing Sheets

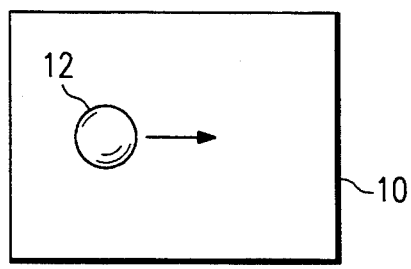
FIG. 1a
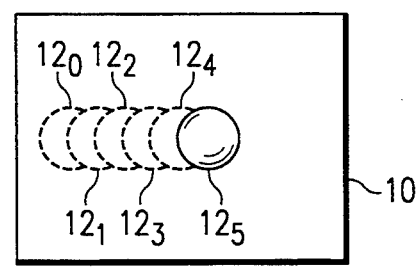
FIG. 1b
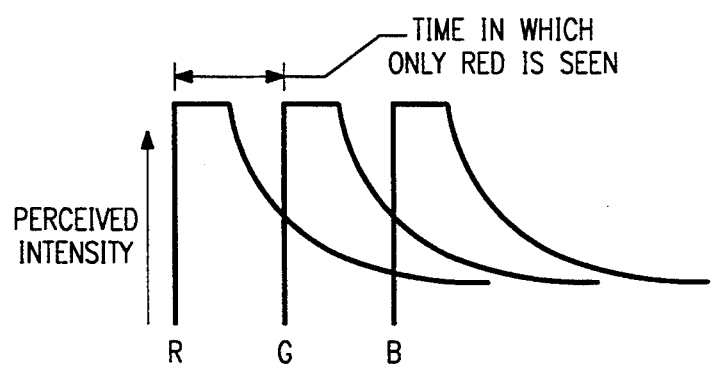
FIG. 2
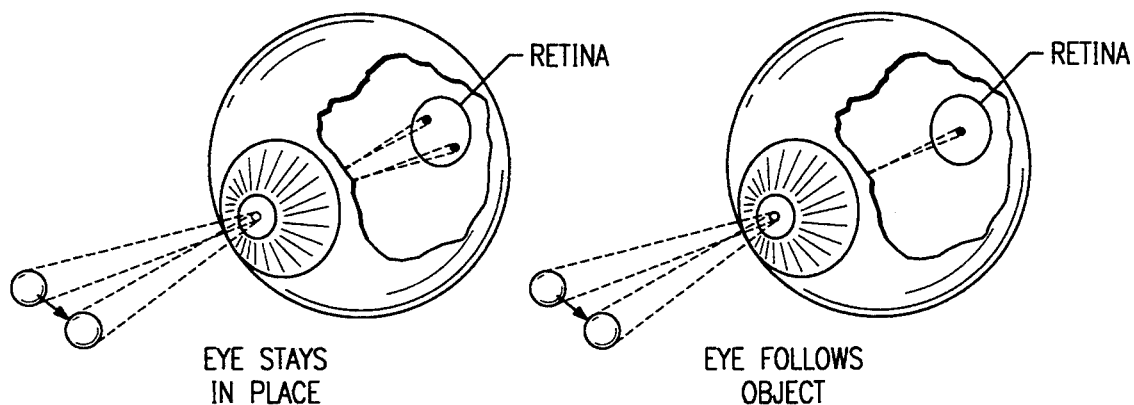
FIG. 3a
FIG. 3b

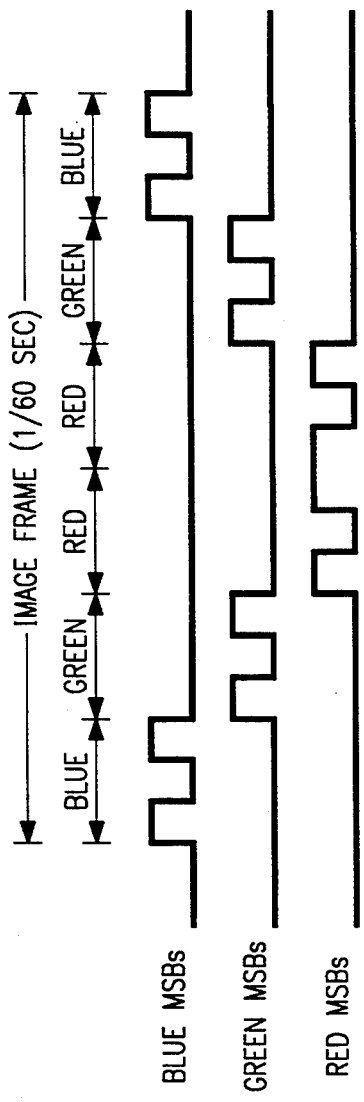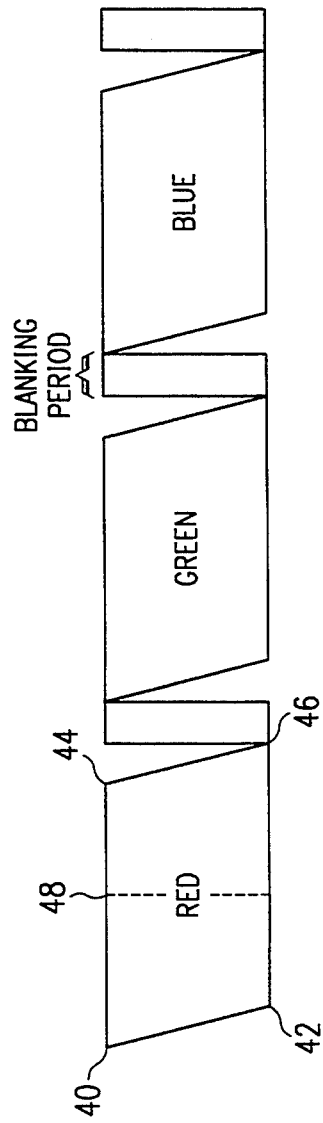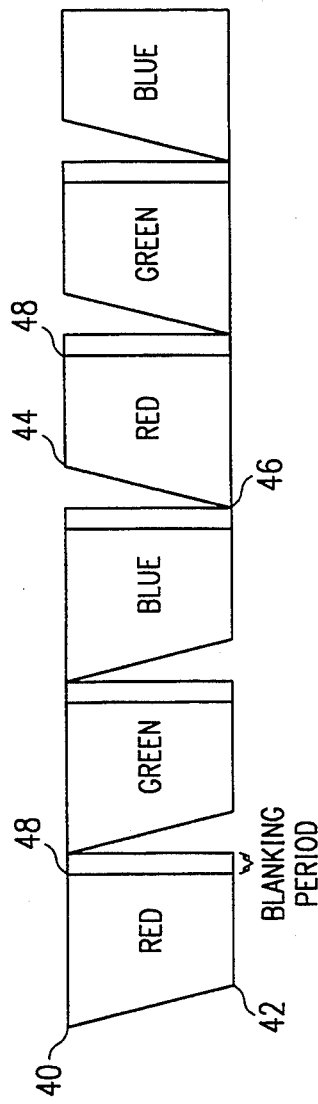
FIG. 6
FIG. 7a
FIG. 7b

METHOD AND APPARATUS FOR SEQUENTIAL COLOR IMAGING

TECHNICAL FIELD OF THE INVENTION

This invention relates generally to imaging systems, and more particularly to a method and apparatus for sequential color imaging.

BACKGROUND OF THE INVENTION

In the field of imaging technology, a significant need exists to increase image quality while at the same time maintaining low cost and low complexity. Unfortunately, these goals often conflict. For example, a particular class of imaging systems, known as sequential color systems, offer lower cost and complexity than other imaging systems, but at the sacrifice of some image quality.

Sequential color systems generate images by sequentially laying down red, green, and blue light in a single image frame, which typically lasts 1/60 of a second. In non-sequential color systems, the red, green, and blue light are laid down simultaneously. The nonsequential color systems, therefore, employ about three times the hardware and complexity of sequential color systems.

An excellent example of the distinction between sequential and non-sequential color systems is provided by spatial light modulator ("SLM") projection systems. One type of SLM imaging systems uses arrays of individual elements, such as deformable mirror devices ("DMDs"), to reflect light onto or away from a projection screen. In non-sequential color systems, three DMD arrays are used in parallel, one each for red, green, and blue light. In contrast, a sequential color system SLM device requires only one such array, with the red, green, and blue light sequentially reflected by the single DMD array. The need for three such arrays in the non-sequential color system triples the requirements for the DMD arrays and attendant hardware over the sequential color system.

As discussed above, however, sequential color systems have certain limitations. One such limitation is that of color separation. Color separation occurs in sequential color systems when an imaged object moves across a projection screen, and the human eye follows it. FIGS. 1–3 illustrate the problem of color separation.

FIG. 1a illustrates a projection screen 10 and an imaged object 12 that will move across the screen 10. In FIG. 1b, the various locations of object 12 are shown at five different time periods. Each of these time periods corresponds to one image frame. For a sequential color system that lays down color in the order of red, green, and then blue, the object 12 will be generated by first laying down the red, then the green, and then the blue. Therefore, as the object moves, the leading edge of the object 12 (with respect to its movement) will appear red, while its trailing edge will appear blue. This phenomenon is known as color separation.

FIGS. 2 and 3 illustrate how color separation occurs. As shown in FIG. 2, red is first laid down on the screen for about ⅓ of the imaging frame. After the red light is turned off, the green light is then turned on for about ⅓ of the color frame, and then the green is turned off and the blue is turned on for the remaining about ⅓ of the color frame. As shown in FIG. 2, the perceived intensity of the light dies away asymptotically after it is turned off. This asymptotic decrease illustrates the fact that the human eye has "memory" which allows it to continue to perceive light for a short period (a time constant) even after the light has disappeared.

The problem of color separation occurs in sequential color systems only when the human eye follows the moving object. As shown in FIG. 3a, if the human eye does not follow the moving object, then each image frame of light from the moving object will fall on different locations of the retina as the object moves. Thus, for each image frame, before red is perceived, the green and blue light will be laid down at one location, and the appropriate color will be perceived. Light from the next image frame will then fall on another location of the retina, and the appropriate color will again be perceived. However, as shown in FIG. 3b, if the eye follows the object, the red light from the object will always fall on one place on the retina, the blue light will always fall on another place on the retina, and the green light will always fall on still another place on the retina. Each of these places will be offset, due to the temporal separation of each color subframe. Therefore, the leading edge of the moving object will always appear red, while the trailing edge will always appear blue. This occurs because the eye moves before the blue and green are laid down at the leading edge, for example. The faster the object moves, the greater will this color separation be, since the distance the object moves from one image frame to the next will be greater.

The color separation becomes more and more complex the faster that an object moves. As described above, the leading edge will appear red and the trailing edge will appear blue, for sequential color systems that lay down red, then green, then blue. As the speed of the object increases, however, not only will the leading edge appear red, but the area of the object just behind the leading edge will appear to be a combination of red and green. Likewise, the area just ahead of the trailing edge will appear to be a combination of blue and green.

The problem of color separation is most notable when the moving object and its background are in high contrast. For example, a white object moving against a black background or a black object moving against a white background. Examples of situations where the human eye might follow such moving objects include sporting events where the human eye may follow a player whose uniform is in high contrast with the background, dance presentations where the human eye may follow the dancer, and other similar situations.

SUMMARY OF THE INVENTION

Therefore, a need has arisen for a sequential color system that reduces perceived color separation, thereby providing for higher image quality.

In accordance with the teachings of the present invention, a method and apparatus for sequential color imaging is provided which substantially eliminates or reduces disadvantages and problems with prior art imaging systems.

In particular, a method of sequential imaging is disclosed in which at least two color subframes of a first color, at least two color subframes of a second color, and at least two color subframes of a third color are generated during one image frame. By generating color subframes in this manner, color separation is greatly reduced.

In another embodiment of the present invention, at least two color subframes of a first color, at least one color subframe of a second color, and at least one color subframe of a third color are generated during one image frame. With this embodiment, for example, two color subframes of the second color can be generated, one each before and after the color subframe of the third color.

In still another embodiment of the present invention, a method of sequential imaging is provided in which a color subframe of a first color, a color subframe of a second color, and a color subframe of a third color are generated in one image frame. During the next image frame, the order that the color subframes are generated is reversed.

A sequential imaging system is also provided in which a light source shines light through a color wheel. A spatial light modulator that includes a plurality of individual elements reflects the light from the color wheel onto a screen. A processor is provided which controls the light source, the color wheel, and the spatial light modulator such that at least two color subframes of a first color, at least one color subframe of a second color, and at least one color subframe of a third color are generated during one image frame.

An important technical advantage of the present invention is that color separation is greatly reduced by increasing the number of color subframes in an image frame, thereby reducing the amount of time that a single color will be perceived. Another important technical advantage of the present invention is the fact that color blending techniques may be used to further reduce color separation in sequential imaging systems.

BRIEF DESCRIPTION OF THE DRAWINGS

For a more complete understanding of the present invention, and the advantages thereof, reference is now made to the following descriptions taken in conjunction with the accompanying drawings in which like reference numbers indicate like features and wherein:

FIGS. 1a and 1b illustrate a moving object on a projection screen;

FIG. 2 illustrates perceived intensities in a sequential color system;

FIGS. 3a and 3b illustrate the interaction between the human eye and a moving object;

FIG. 6 illustrates color blending according to the teachings of the present invention; and FIGS. 7a and 7b illustrate a technique for packing bit patterns for a split reset system according to the teachings of the present invention.

DETAILED DESCRIPTION OF THE INVENTION

FIGS. 1a-3b have been described in connection with the background of the invention, and explain the problem of color separation in sequential color systems. Sequential color systems include a myriad of different technologies, including SLM technologies (a subset of which is DMD technologies) and CRT technologies. Particular applications for sequential color systems include conventional television (whether in NTSC, PAL, SECAM, or other formats), wide scene conventional television, high definition television, industrial projectors, home use projectors, and cinema projectors, among other applications.

Figure 4:
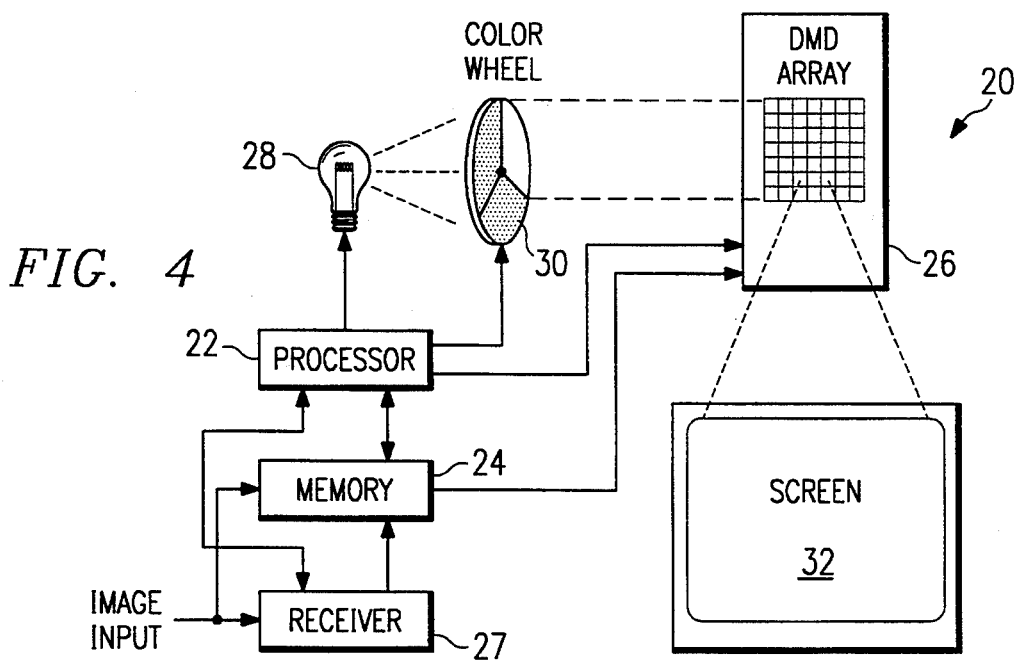
FIG. 4 illustrates a block diagram of a particular imaging system according to the teachings of the present invention.

FIG. 4 illustrates a block diagram of a particular application of the present invention. As shown, sequential color imaging system 20 includes a processor 22 that controls a DMD imaging system. Processor 22 is coupled to memory 24 and DMD array 26. Memory 24 may also be coupled to DMD array 26 for direct memory input to DMD array 26. Processor 22 may also be coupled to receiver 27. Receiver 27 receives image inputs, such as analog or digital video images transmitted across a cable system or the air waves. Data from the receiver 27 is stored in memory 24. Memory 24 may also receive input directly from the image input, for example when the image input transmits in digital image data. Image input data received by receiver 27 can be processed by processor 22 to convert it to the appropriate format for operation with DMD array 26, a light source 28, and a color wheel 30.

Processor 22 controls light source 28, color wheel 30, and DMD array 26 such that light from light source 28 is transmitted through color wheel 30, reflected off DMD array 26, and onto a screen 32.

The imaging system 20 of FIG. 4 may be either a rear projection or front projection system. Furthermore, as described above, the present invention works for a variety of technologies, and the particular shown in FIG. 4 is exemplary only.

FIGS. 5a-5d illustrate various embodiments of color wheel 30 constructed according to teachings of the present invention. Color wheel 30 turns so as to allow sequential color fields to be reflected from DMD array 26 onto screen 32. Color wheel 30 is used to illustrate the present invention, it being understood that the techniques discussed in connection with color wheel 30 can be used to control other devices as well. For example, three light sources, a red light source, a green light source, and a blue light source can be used with a single DMD array to sequentially generate red, green and blue fields. Similarly, in a CRT system, electron beams that are used to generate red, then green, then blue can be sequenced according to the following teachings.

Figure 5A:
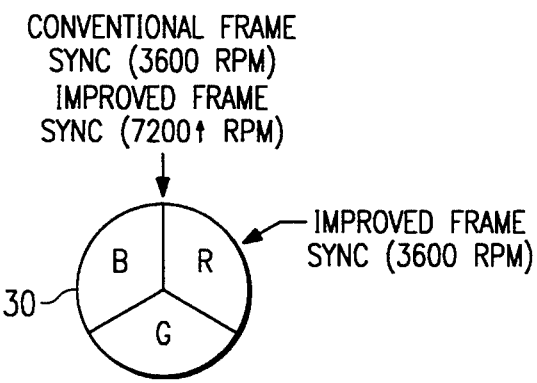
FIGS. 5a-5d illustrate alternate embodiments of the present invention.

As shown in FIG. 5a, color wheel 30 is provided with three color fields, red, green, and blue, each of which is approximately one-third of the useful area of the color wheel 30. For a single image frame, typically 1/60 of a second, conventional systems rotate color wheel 30 once per image frame, or at a rate of 3,600 revolutions per minute (RPM). In such systems, there are three color subframes, one each for red, green, and blue, and each image frame is begun (synchronized) at the conventional frame synchronization (SYNC) point shown in FIG. 5a.

In one embodiment of the present invention, the conventional frame SYNC is moved to the middle of the red subframe, as shown in FIG. 5a. With this improved frame SYNC, the color wheel is rotated at 3,600 RPM. Moving the frame SYNC to the middle of the red subframe results in a color sequence of one-half red subframe, one green subframe, one blue subframe, and one-half red subframe. The result is that the amount of time that the human eye perceives red at the leading edge of a moving object is reduced in half. Thus, the human eye will begin to mix the red and the green more quickly, thus providing for a leading edge that is closer to the desired color than in conventional systems. With this improved frame SYNC, the red subframe is split into two subframes, one coming before the green subframe, and the other coming after the blue subframe. Thus, the mirrors of DMD array 26 will have to be set one additional time, resulting from the fact that the red subframe will have to be set once at the beginning of the video frame, and then completed after the blue subframe. It should be understood that the frame SYNC could also be placed in the middle of the blue or green color subframes as well.

FIG. 5a also illustrates another embodiment of the present invention, in which the image frame is begun in the same place as a conventional video frame, except that the color wheel is rotated at a higher rate. This higher rate will reduce the amount of time that the leading edge will be one particular color, such as red in the example being discussed. For example, by rotating the color wheel at twice the conventional speed, or 7,200 RPM, a single image frame will include two red subframes, two green subframes, and two blue subframes. The order of the subframes will be red, green, blue, red, green, blue. To implement such a scheme, each of the color subframes of a conventional system are divided into two subframes, each lasting half as long as a conventional color subframe. Experiments have shown that the sequencing of the color subframes should be increased to about four times the conventional rate to eliminate the perception of color separation. However, the use of a lower rate, such as twice the conventional rate, improves the perception of color separation, but does not eliminate it completely. Complexity and costs are increased as the speed increases, and thus the particular application will dictate how much speed increase is appropriate.

Figure 5B:
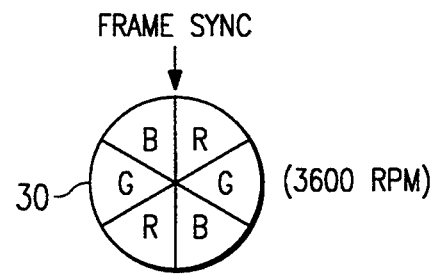

FIG. 5b illustrates another embodiment of the present invention in which color wheel 30 is divided into six color subframes, having a sequence of red, green, blue, red, green, and blue, each of which is approximately one-sixth the useful area of color wheel 30. This color wheel is rotated at the conventional rate of 3,600 RPM and SYNCHed as shown in FIG. 5b. The embodiment of FIG. 5b results in the same advantages as the higher speed embodiment discussed in connection with FIG. 5a, since the length of time of each color subframe is half that of conventional systems. The embodiment of FIG. 5b allows for use of conventional motors to drive the color wheel, since it rotates at the conventional speed of 3,600 RPM. However, some brightness reduction occurs with the embodiment of FIG. 5b as compared to the embodiments of FIG. 5a, due to the increased light source blanking time (to allow transitions between the color subframes).

The particular color wheel shown in FIG. 5b may also be rotated at a rate higher than 3,600 RPM, resulting in color subframes of even shorter lengths of time. Increasing the speed at which the color subframes are presented significantly reduces or eliminates color separation.

Figure 5C:
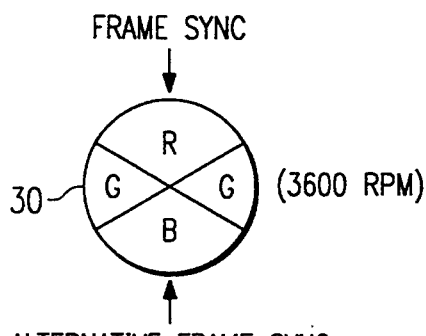

FIG. 5c illustrates another embodiment of the present invention, in which color wheel 30 is divided as follows: approximately one-third of the color wheel is red, approximately one-third of the color wheel is blue, and approximately one-third of the color wheel is green. However, the green is divided into two separated sections each of about one-sixth of the useful area of the color wheels, each angularly disposed between the red and the blue portions of the color wheel 30. The frame SYNC is provided at the middle of the red portion of the color wheel. Thus, for one image frame, the sequence will be ½ red subframe, ½ green subframe, one blue subframe, ½ green subframe, and ½ red subframe. This embodiment is similar to the first embodiment discussed in connection with FIG. 5a, with the difference that the green subframe is split into two subframes surrounding the blue subframe. This is particularly effective because of the fact that red, green, and blue light carry different perceptual weightings. In general, the human eye perceives green light better than it perceives red light, and blue light is perceived worst. Tests have shown that green light is perceived about five times better than blue light, and green light is perceived almost twice as well as red light. Thus, with the embodiment of FIG. 5c, better color mixing is achieved by splitting the green light into two color subframes.

Another embodiment shown in FIG. 5c allows for an alternative frame SYNC in the middle of the blue color subframe. SYNCing each video frame in the middle of the blue color subframe, rather than in the middle of the red color subframe, provides that blue light will be at the leading edge and trailing edge of a moving object. As discussed above, blue is perceived least by the human eye, and thus this embodiment will result in greater reduction in perceived color separation.

For both the embodiments discussed in connection with FIG. 5c, the speed of the color wheel may also be increased, resulting in greater reductions in color separation, but adding complexity, as discussed above.

Figure 5D:
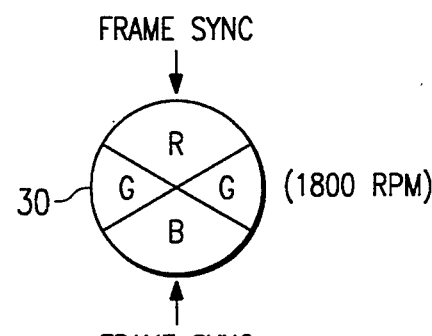

FIG. 5d illustrates another embodiment of the present invention in which the color wheel is configured similarly to the color wheel in FIG. 5c. However, the color is rotated at a speed to allow for two video frames to be written in one color wheel revolution. For example, for conventional image frames of 1/60 of a second, the color wheel 30 of FIG. 5d would be rotated at 1,800 RPM. Thus, two frame SYNCs are needed in one revolution. By placing the frame SYNCs, as shown in FIG. 5d, in the middle of the red and in the middle of the blue color subframes, perceived color separation is greatly reduced. With the color wheel 30 of FIG. 5d, the sequence of one image frame is red, green, blue, as in conventional systems. However, the next image frame sequence is blue, green, red. This alternating sequence for each image frame results in the leading edge of the moving object flickering from red to blue and blue to red at a rate of half the image frame frequency, for example, a flicker of 30 Hz for an image frame frequency of 60 Hz. The trailing edge of the moving object will have the same flicker. This flicker may be perceived as a flicker or as a combination of red and blue, for example, magenta. The result is a perception that the leading edge and trailing edge of the moving object are closer to the true color than in conventional systems. Furthermore, as the moving object changes direction, the leading and trailing edges will not "switch" colors, as occurs with conventional systems.

As discussed previously, the examples of the color wheels shown in FIGS. 5a–5d are for purposes of teaching the present invention, and are illustrative of techniques for sequencing color frames. These sequencing techniques can apply to other technologies as well, such as to CRT technologies. Furthermore, the above examples disclose frame SYNCs at particular locations. For example, in the embodiment of FIG. 5b, the frame SYNC is shown as occurring between the blue and red color subframes. The frame SYNC could be moved, for example, between the green and blue color subframes, without departing from the intended scope of the present invention.

FIG. 6 illustrates another aspect of the present invention that may be used to augment the techniques discussed above. In some DMD based imaging systems, the intensity of any color is created by the pulse width modulation of the mirrors of the array. For example, to generate a mid level green, a mirror may be on for half of a color subframe, with the total on time being the result of several on-off sequences of different lengths. The on-off times are controlled by bits stored in memory. By distributing the on time of the most significant color intensity bits across each of the color segments, additional blending of color and consequent reduction in perceived color separation can be achieved. Processor 22 controls the pulse width modulation of the DMD array. FIG. 6 illustrates a particular example of this technique.

As shown, an image frame is divided into six color subframes, two for blue, two for green and two for red. The particular sequence of blue, green, red, red, green, blue corresponds to the second embodiment shown in FIG. 5c, it being understood, however, that the technique illustrated applies to any of the techniques discussed in connection with FIG. 5a-5d.

As can be seen in FIG. 6, the most significant bits for the pulse width modulation of each of the blue, green, and red subframes are on (if at all) as close to the other colors as possible. For example, the most significant bits for the green color subframes are on as close as possible in time to the transitions from blue to green and green to red. Likewise, the most significant bits for the blue subframes are on as close as possible in time to the transitions from green to blue and blue to green. The same is true for the red most significant bits as well. Furthermore, bits other than the most significant bits may also be turned on as close as possible to color transitions to increase color blending.

FIGS. 7a and 7b illustrate a technique by which bit patterns can be packed for a split reset DMD projector system that includes the techniques discussed above. U.S. patent application Ser. No. 08/002,627, entitled "Pixel Control Circuitry for Spatial Light Modulator," TI-17333, filed on Jan. 8, 1993, and assigned to TEXAS INSTRUMENTS INCORPORATED discloses a split reset DMD image system and is herein incorporated by reference. Generally speaking, split reset DMD systems divide a DMD array into a number of reset groups. For example, an array may be divided into sixteen reset groups of 25,000 mirrors each. A single memory cell controls one mirror in each reset group, and thus the mirrors of no two reset groups can be changed at once. When using pulse width modulation to generate color intensity, all the bits of one reset group from one bit location are loaded into memory, and that reset group is then changed according to the loaded bits. For example, with 8-bit pulse width modulation, all of the eighth-location bits for a reset group are loaded at once. Next, the memory is loaded with pulse width modulation bits for another reset group, and that reset group is changed according to that load of the memory, and this cycle continues such that all pulse width modulation bits of each reset group are loaded and executed within a single image frame. The bit packing is performed by processor 22 and memory 24 of FIG. 4. It should be understood that memory 24 may be separate from or integral with DMD array 26.

A graphic representation of the loading of split reset groups is shown in FIG. 7a. As shown by the parallelogram of FIG. 7a, the first reset group is loaded with a particular bit at point 40. The last reset group is first loaded with a particular bit at point 42. As time goes on, all of the pulse width modulation bits for each reset group are loaded at different times (as no two reset groups can be changed at once). The first reset group completes all bits of its pulse width modulation at point 44, while the last reset group completes all bits of its pulse width modulation at point 46.

With the present invention, for example the embodiments shown in FIGS. 5a, 5b, and 5c, wherein there are two or more color subframes for each color during each image cycle, bit packing for a split reset DMD will be performed as shown in FIG. 7b. FIG. 7b particularly illustrates the increased speed embodiment of FIG. 5a wherein the sequence may be red, green, blue, red, green, blue. In the first red color subframe, the first reset group is loaded at point 40, just as in FIG. 7a. Similarly, the last reset group is first loaded at point 42, just as in FIG. 7a. Particular bits are then loaded in each of the split reset groups until point 48, at which time the green subframe is to begin. The space between the point 48 and the beginning of the green subframe is the blanking time required for transitions between colors on the color wheel.

The end of the red color subframe of FIG. 7b is vertical, and not slanted as in FIG. 7a, since all mirrors of all split reset groups can be reset to the same position at once. During the second red color subframe, the split reset groups will be loaded so as to finish the pulse width modulation not yet completed at the end of the first red color subframe. This is accomplished by loading the split reset groups for the second red color subframe in the reverse order than this half of the red subframe would have been completed in FIG. 7a. Thus, the first reset group is loaded at point 44, and the last reset group is loaded at point 46, until all of the pulse width modulation bits have been loaded and executed at point 48. This technique is used for the green and blue color subframes as well, as shown in FIG. 7b.

Thus, when there are two color subframes for each color in a single image frame, all of the pulse width modulation bits for a split reset DMD imaging system can be packed without any efficiency loss due to the bit packing sequence. The only efficiency losses, if any at all, come from the fact that the additional color subframes require more blanking time as the light is changed from one color to the next, resulting in somewhat reduced brightness.

When more than two color subframes for each color are used, for example with a color wheel turning at four times the conventional speed, there will be more split reset start periods than in a conventional split reset system, thus requiring either faster loading of each split reset group to perform all pulse width modulation bits in the appropriate video frame time, or the loss of efficiency if not all of the pulse width modulation bits are completed.

Although the present invention has been described in detail, it should be understood that various modifications, alterations, or substitutions can be made without departing from the spirit and scope of the invention as defined by the appended claims.

What is claimed is:

1. A method of sequential imaging, comprising the steps of:
   generating at least two color subframes of a first color during one image frame;
   generating at least two color subframes of a second color during said one image frame; and generating at least two color subframes of a third color during said one image frame, wherein said generating of said first, second and third colors is accomplished by pulse width modulation of individual elements of a spatial light modulator for predetermined on and off times.

2. The method of claim 1, and further comprising the steps of:
shining light through a color wheel onto said spatial light modulator; and
rotating the color wheel to generate each of the color subframes.

3. The method of claim 2, wherein the color wheel is rotated at least twice during the image frame.

4. The method of claim 2, wherein the color wheel is rotated once during the image frame.

5. A method of sequential imaging, comprising the steps of:
generating at least two color subframes of a first color during one image frame;
generating at least one color subframe of a second color during said one image frame; and
generating at least one color subframe of a third color during said one image frame, wherein said generating of said first, second and third colors is accomplished by pulse width modulation of individual elements of a spatial light modulator for predetermined on and off times.

6. The method of claim 5, wherein said color subframes of the first color are generated at the beginning and end of the image frame.

7. The method of claim 6, wherein:
two color subframes of the first color are generated;
one color subframe of the third color is generated; and
two color subframes of the second color are generated, one each of the color subframes of the second color being generated before and after the color subframe of the third color.

8. The method of claim 5, and further comprising the steps of:
shining light through a color wheel onto said said spatial light modulator; and
rotating the color wheel to generate each of the color subframes.

9. The method of claim 5, wherein the color wheel is rotated at least twice during the image frame.

10. The method of claim 5, wherein the color wheel is rotated once during the image frame.

11. The method of claim 5, and further comprising the steps of:
distributing the on times within each color subframe such that said on times occur as near in time as possible as the on times within adjacent color subframes.

12. A method of sequential imaging, comprising the steps of:
generating a color subframe of a first color during one image frame;
after the first color subframe, generating a color subframe of a second color during said one image frame;
after the second color subframe, generating a color subframe of a third color during said one image frame; and during the next image frame, generating the color subframes in reverse order.

13. The method of claim 12, and further comprising the steps of:
shining light through a color wheel onto a spatial light modulator; and
rotating the color wheel to generate each of the color subframes.

14. A sequential imaging system, comprising:
a light source;
a color wheel through which light from said light source is shone;
a spatial light modulator including a plurality of individual elements for receiving the light through said color wheel and operable to generate images using said light;
a processor operable to control said light source, said color wheel, and said spatial light modulator such that at least two color subframes of a first color are generated during said one image frame, at least one color subframe of a second color is generated during said one image frame and at least one color subframe of a third color is generated during said one image frame, wherein generating of said first, second and third colors is accomplished by said processor controlling the pulse width modulation of said individual elements of said spatial light modulator for predetermined on and off times.

15. The system of claim 14, wherein said color subframes of the first color are generated at the beginning and end of the image frame.

16. The system of claim 14, wherein said color wheel comprises:
a first area of the first color, the size of which is approximately one-third of the useful area of said color wheel;
a second area of the second color, the size of which is approximately one-sixth of the useful area of said color wheel;
a third area of the third color, the size of which is approximately one-third of the useful area of said color wheel; and
a fourth area of the second color, the size of which is approximately one-sixth of the useful area of said color wheel, said second and fourth areas being separated angularly by said third area.

17. The system of claim 14, wherein the color wheel is rotated at least twice during the image frame.

18. The system of claim 14, wherein said color wheel is rotated once during the image frame.

19. The system of claim 14, wherein said processor distributes the on times within each color subframe as near in time as possible to on times of adjacent color subframes.

20. The system of claim 14, wherein the system is a split reset DMD system having a plurality of groups of individual elements, wherein there are two color subframes for each color during the image frame, and wherein said individual elements are controlled with pulse width modulation bits for the predetermined on and off times, and further comprising circuitry operable to:
load one half of said bits for each color during a first respective color subframe for each color;
reset said individual bits at the end of each color subframe; and
load the remaining portion of said bits for each color during a second respective color subframe for each color.

* * * * *